Patented May 4, 1954

2,677,704

UNITED STATES PATENT OFFICE 2,677,704

PREPARATION OF AN AMINOPROPANE DIOL

Robert Michel Jacob, Ablon-sur-Seine, France, assignor to Parke, Davis & Company, Detroit, Mich.

No Drawing. Application July 10, 1952, Serial No. 298,201

Claims priority, application France July 18, 1951

9 Claims. (Cl. 260—519)

This invention is for improvements in or relating to the preparation of DL-erythro 2-o-carboxybenzamido-1-p-nitrophenylpropane 1:3-diol. This application is a continuation-in-part of copending application Serial No. 212,483, filed February 23, 1951, now Patent No. 2,628,975 issued February 17, 1953.

The process described in said patent comprises condensing p-nitrobenzaldehyde with α-phthalimidoacetaldehyde in the presence of a basic condensing agent to produce a reaction product having a melting point between 145° and 185° C. and believed to consist of an addition product of the aldol:

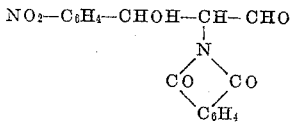

with α-phthalimidoacetaldehyde, reducing the condensation product under conditions precluding reduction of a nitro group to form 2-phthalimido-1-p-nitrophenylpropane 1:3-diol, hydrolysing this reduction product under alkaline conditions to form DL-erythro 2-o-carboxybenzamido-1-p-nitrophenylpropane 1:3-diol.

A modification of or improvement in the process described in said Patent 2,628,975 is disclosed in copending application Serial No. 281,033 filed April 7, 1952.

Research and experimentation designed to discover the optimum conditions for the foregoing process lead to the conclusion that the aldol condensation product should be isolated from the reaction medium in which it is formed before it is reduced to 2-phthalimido-1-p-nitrophenylpropane 1:3-diol.

It has now unexpectedly been found that the aforesaid condensation and reduction stages can be simplified and, at the same time, a substantially increased yield achieved provided that certain reaction conditions hereinafter set forth are employed.

The present invention broadly consists in a process for the preparation of 2-o-carboxybenzamido-1-p-nitrophenylpropane 1:3-diol in which p-nitrobenzaldehyde is reacted with α-phthalimidoacetaldehyde in the presence of caustic alkali or alkali metal alcoholate in a solvent medium consisting of a solvent of the cyclic ether-oxide, aliphatic nitrile or tertiary amide type for a period not exceeding a few hours' time, after which reduction of the aldol condensation product is effected in situ by the addition to the condensation reaction mixture of an alkali metal borohydride together with a quantity of methanol as reduction promoter, and the reduction product is hydrolysed under alkaline conditions.

If the aldol condensation and subsequent reduction are to be successfully effected in a single phase, it is essential that the condensation medium shall be a solvent of the type defined in the last preceding paragraph, for many solvents, such as acetone and pyridine, which are quite satisfactory for aldol condensation in a two-stage process involving isolation of the intermediate aldol are not suitable for single phase operation as their presence is detrimental to satisfactory reduction of the aldol. It is equally essential that, after formation in situ of the aldol, a promoter quantity of methanol be added to the reaction medium, the precise quantity depending upon the particular reaction conditions employed as will be illustrated in the examples hereinafter given.

In carrying the process of the present invention into effect, it is preferred to effect the aldol condensation in the presence of an alkali metal alcoholate, such as potassium ethylate, as the condensing agent and in an anhydrous reaction medium in the form of a cyclic ether-oxide, such as dioxane, tetrahydrofuran or glycol formal, containing less than 0.1% to 0.3% by weight of water.

For best results, it is preferred for the reduction stage to adjust the composition of the reaction medium such that the reduction is effected in the presence of a small quantity of water and of caustic alkali. This is conveniently achieved by incorporating the promoter methanol in the form of methanol containing a minor proportion of water, for example from 0.5% to 2.5% by weight of water, and a small quantity of sodium hydroxide, for example enough to give a normality of about 0.015. For the reducing agent, it is preferred to employ crystalline potassium borohydride.

The process of the present invention is illustrated by the following examples.

Example I 113.4 g. of α-phthalimidoacetaldehyde and 45.4 g. of p-nitrobenzaldehyde are dissolved in 300 cc. of anhydrous dioxane. The solution obtained is cooled to 0° C. and 6 cc. of 4N caustic soda are added. A fairly brisk reaction takes place, which raises the temperature to about 10° C. despite the external cooling. The product is then allowed to stand for 2 hours in the cold; the mass crystallises. The mass is taken up in 600 cc. of technical methanol, and 10 g. of potassium borohydride are introduced into the suspension at +5° C. The suspension is agitated and the temperature is allowed to rise to room temperature. A further 8 g. of borohydride are then added at about 15° C. and a limpid yellowish-brown solution is obtained. 900 cc. of water are then added, followed by 150 cc. of 4N caustic soda, the mixture being cooled to maintain the temperature at about 20° C. The product is then acidified with 600 cc. of 4N sulphuric acid, whereupon 2-o-carboxybenzamido-1-p-nitrophenylpropane 1:3-diol crystallises. It is filtered off, washed and dried.

57.7 g. of diol having a melting point (cap.) of 167° C. are obtained.

In a parallel experiment, the intermediate condensation product was isolated and this, on reduction, gave only 42.8 g. of final product.

Example II 18.9 g. of α-phthalimidoacetaldehyde and 15.1 g. of p-nitrobenzaldehyde are dissolved in 50 cc. of anhydrous dioxane. The mixture is cooled to about 0° C. and 2 cc. of 4N caustic soda are added. The condensation reaction takes place with rise in temperature to about 10° C. The product is then cooled to −2° C. and 5 g. of potassium borohydride are added, followed by 3 cc. of technical methanol. Reduction is accompanied by rise in temperature to about 10° C.; 100 cc. of 2N caustic soda are added, the mixture is agitated at 15° C. and then acidified with dilute sulphuric acid. The product thereby precipitated is then filtered off, washed and dried. A total of 14.6 g. of 2-o-carboxybenzamido-1-p-nitrophenylpropane 1:3-diol are obtained.

Example III 5.67 g. of α-phthalimidoacetaldehyde and 2.27 g. of p-nitrobenzaldehyde are dissolved in 15 cc. of anhydrous tetrahydrofuran. The solution thus obtained is cooled to 0° C. and 0.2 cc. of an alcoholic solution containing 18% of potassium ethylate is added. Despite the external cooling the temperature rises to 9° C. The mixture is left in the cold, i. e. at a temperature lower than 5° C., for 2 hours, and 0.5 g. of potassium borohydride in small portions, 30 cc. of technical methanol containing 1% (v./v.) of water and 0.064% of caustic soda, are then added, the temperature being maintained below 5° C. The temperature of the mixture rises to between 5° C. and 10° C. and a further 0.4 g. of potassium borohydride is then added. The temperature is allowed to rise to room temperature (20° C.). The mixture is then cooled and 45 cc. of water are added, followed by 15 cc. of 4N caustic soda. The mixture is then acidified by adding a little at a time, a total of 25 cc. of 4N sulphuric acid, the temperature being maintained at about 10° C. The mixture is agitated for one hour, and the product 2-o-carboxybenzamide-1-p nitrophenylpropane 1:3-diol is filtered off. It is washed with water, then with alcohol and dried. There are thus obtained 2.95 g. of product having a melting point of 171°–173° C.

If the tetrahydrofuran employed in the foregoing example is replaced by the following solvents, the quantities of final product obtained are as given below:

| Solvent | Yield of Product |
|---|---|
| Glycol formal | 2.72 g., M. P.: 168°–169° C. |
| Acetonitrile | 1.70 g., M. P.: 166°–167° C. |
| Dimethylformamide | 1.57 g., M. P.: 160°–161° C. |
| Formylmorpholine | 2 g., M. P.: 168°–169° C. |
| Tetrahydropyran | 1.43 g., M. P.: 172°–174° C. |

I claim:

1. A process for the preparation of 2-o-carboxybenzamido-1-p-nitrophenylpropane 1:3-diol which comprises reacting p-nitrobenzaldehyde with α-phthalimidoacetaldehyde in the presence of a basic condensing agent of the class consisting of alkali metal hydride and alkali metal alcoholate in a solvent medium consisting of a solvent of the class consisting of cyclic ether-oxides, aliphatic nitriles and tertiary amides for a period not exceeding a few hours and directly treating the condensation reaction mixture thus obtained with an alkali metal borohydride together with a quantity of methanol as reduction promoter by hydrolyzing the reduction product thus obtained under alkaline conditions and acidifying to precipitate said diol.

2. A process as claimed in claim 1 in which said condensing agent is an alkali metal alcoholate.

3. A process for the preparation of 2-o-carboxybenzamido-1-p-nitrophenylpropane 1:3-diol in which p-nitrobenzaldehyde is condensed with α-phthalimidoacetaldehyde in the presence of an alkali metal alcoholate as condensing agent and in a solvent medium consisting of a cyclic ether-oxide solvent containing less than about 0.3% by weight of water and in which reduction of the aldol condensation product is effected in situ by the addition to the condensation reaction mixture of an alkali metal borohydride together with a quantity of methanol as reduction promoter, and the reduction product is hydrolysed under alkaline conditions.

4. A process for the preparation of 2-o-carboxybenzamido-1-p-nitrophenylpropane 1:3-diol in which p-nitrobenzaldehyde is condensed with α-phthalimidoacetaldehyde in the presence of potassium ethylate as condensing agent and in a solvent medium consisting of a cyclic ether-oxide solvent containing less than about 0.3% by weight of water and in which reduction of the aldol condensation product is effected in situ by the addition to the condensation reaction mixture of an alkali metal borohydride together with a quantity of methanol as reduction promoter, and the reduction product is hydrolysed under alkaline conditions.

5. A process for the preparation of 2-o-carboxybenzamido-1-p-nitrophenylpropane 1:3-diol in which p-nitrobenzaldehyde is condensed with α-phthalimidoacetaldehyde in the presence of potassium ethylate as condensing agent and in a solvent medium consisting of dioxane containing less than about 0.3% by weight of water and in which reduction of the aldol condensation product is effected in situ by the addition to the condensation reaction mixture of an alkali metal borohydride together with a quantity of methanol as reduction promoter, and the reduction product is hydrolysed under alkaline conditions.

6. A process for the preparation of 2-o-carboxybenzamido-1-p-nitrophenylpropane 1:3-diol in which p-nitrobenzaldehyde is condensed with α-phthalimidoacetaldehyde in the presence of potassium ethylate as condensing agent and in a solvent medium consisting of tetrahydrofuran containing less than about 0.3% by weight of water and in which reduction of the aldol condensation product is effected in situ by the addition to the condensation reaction mixture of an alkali metal borohydride together with a quantity of methanol as reduction promoter, and the reduction product is hydrolysed under alkaline conditions.

7. A process for the preparation of 2-o-carboxybenzamido-1-p-nitrophenylpropane 1:3-diol in which p-nitrobenzaldehyde is condensed with α-phthalimidoacetaldehyde in the presence of potassium ethylate as condensing agent and in a solvent medium consisting of glycol formal containing less than about 0.3% by weight of water and in which reduction of the aldol condensation product is effected in situ by the addition to the condensation reaction mixture of an alkali metal borohydride together with a quantity of methanol as reduction promoter, and the reduction product is hydrolysed under alkaline conditions.

8. A process for the preparation of 2-o-carboxybenzamido-1-p-nitrophenylpropane 1:3-diol in which p-nitrobenzaldehyde is condensed with α-phthalimidoacetaldehyde in the presence of an alkali metal alcoholate as condensing agent and in a solvent medium consisting of dioxane containing less than about 0.3% by weight of water, reducing the aldol condensation product in situ by the addition to the condensation reaction mixture of potassium borohydride together with a quantity of methanol as reduction promoter in the presence of a small quantity both of water and of caustic alkali, and thereafter hydrolysing the reduction product under alkaline conditions.

9. A process as claimed in claim 8 in which for the reduction step the composition of the reaction medium is adjusted to contain from 0.5% to 2.5% by weight of water and a quantity of sodium hydroxide sufficient to give a normality of about 0.015.

References Cited in the file of this patent

UNITED STATES PATENTS

| Number | Name | Date |
|---|---|---|
| 2,483,885 | Crooks et al. | Oct. 4, 1949 |
| 2,516,098 | Bambas | July 25, 1950 |